(12) United States Patent
Garg et al.

(10) Patent No.: US 9,569,264 B2
(45) Date of Patent: Feb. 14, 2017

(54) MULTI-CORE SYSTEM FOR PROCESSING DATA PACKETS

(71) Applicants:Vakul Garg, Shahdara (IN); Bharat Bhushan, Rewari (IN); Ruchika Gupta, Delhi (IN)

(72) Inventors: Vakul Garg, Shahdara (IN); Bharat Bhushan, Rewari (IN); Ruchika Gupta, Delhi (IN)

(73) Assignee: Freescale Semiconductor,Inc., Austin, TX (US)

( * ) Notice: Subject to any disclaimer, the term of this patent is extended or adjusted under 35 U.S.C. 154(b) by 30 days.

(21) Appl. No.: 14/660,905

(22) Filed: Mar. 17, 2015

(65) Prior Publication Data

US 2016/0274936 A1 Sep. 22, 2016

(51) Int. Cl.
*G06F 9/48* (2006.01)
*G06F 9/46* (2006.01)
*G06F 9/52* (2006.01)

(52) U.S. Cl.
CPC .............. *G06F 9/4881* (2013.01); *G06F 9/466* (2013.01); *G06F 9/52* (2013.01)

(58) Field of Classification Search
None
See application file for complete search history.

(56) References Cited

U.S. PATENT DOCUMENTS

| 6,804,632 | B2 | 10/2004 | Orenstien et al. | |
| 7,389,440 | B2 | 6/2008 | Bailey et al. | |
| 7,526,661 | B2 | 4/2009 | Nakajima et al. | |
| 8,732,439 | B2 | 5/2014 | Lippert | |
| 2003/0204552 | A1* | 10/2003 | Zuberi | H04L 69/12 718/103 |
| 2012/0134320 | A1* | 5/2012 | Khawer | H04L 49/90 370/328 |
| 2013/0024871 | A1 | 1/2013 | Gao et al. | |
| 2014/0089936 | A1 | 3/2014 | Chang | |

\* cited by examiner

*Primary Examiner* — Brian W Wathen
*Assistant Examiner* — Abdou Seye
(74) *Attorney, Agent, or Firm* — Charles E. Bergere (57) ABSTRACT

A data processing system includes a host processor, a co-processor, and a memory that includes multiple buffer descriptor (BD) rings. The host processor includes multiple cores that execute multiple threads to process data packets stored in the memory. The host processor generates a notification command based on multiple context switch events that occur in the cores. The notification command indicates a context switch event type and BD ring IDs associated with BD rings to be polled by the co-processor. The BD rings are referred to as active BD rings. The co-processor polls only the active BD rings based on the notification command and processes the data packets associated with the active BD rings.

14 Claims, 4 Drawing Sheets

MULTI-CORE SYSTEM FOR PROCESSING DATA PACKETS

BACKGROUND OF THE INVENTION

The present invention generally relates to data processing systems, and, more particularly, to a multi-core data processing system for managing data packets in a communication network.

Communication networks including computer networks, telephone networks, and cellular networks are implemented using various technologies such as circuit-switching, packet-switching, and message-switching. Packet-switched networks are digital networks in which multiple data processing systems such as gateways, switches, access points, and base stations communicate by way of data packets. A data processing system may include a single- or multi-core processor. In a multi-core processor, two or more cores are used to distribute the received data packets among themselves for processing. The multiple cores execute a large number of user space and kernel space threads (collectively referred to as "threads") for processing the received data packets. Examples of user space threads include application software and file system driver threads, and examples of kernel space threads include operating system (OS) threads and physical device driver threads.

Each OS includes a scheduler that manages the utilization of the data processing system resources such as processor time, communication bandwidth, and buffer descriptor (BD) rings for processing the threads. The scheduler may be a pre-emptive scheduler or a co-operative scheduler. A pre-emptive scheduler interrupts a thread being executed by a core (also referred to as a "running thread") and schedules-in an alternate thread for processing by the core, whereas a co-operative scheduler does not schedule-in the thread for processing by the core until execution of the running thread is completed.

The data processing system further includes a memory and a co-processor. The memory includes a data buffer that stores the data packets. The co-processor assists the cores in processing the data packets by performing additional functions such as encryption, decryption, pattern matching, and decoding of the data packets, thereby accelerating packet processing. Examples of the co-processors include cryptographic co-processors, compression accelerators, pattern-matching accelerators, encryption hardware accelerators and input/output (I/O) accelerators such as security encryption controllers, Ethernet controllers, and network-attached storage (NAS) accelerators. The data packets may either be received over the communication network or generated by the data processing system.

The co-processor and the cores communicate by way of the BD rings. The BD rings are stored in the memory. Each BD ring includes a plurality of BDs in the form of an array. A BD holds a pointer to a data packet stored in the data buffer and describes status, size, and location of the data packet in the memory. The BD rings are of two types: transmit BD rings and receive BD rings. A transmit BD ring includes BDs corresponding to the data packets that are processed by the cores. The co-processor polls the transmit BD ring to check for availability of such data packets, processes the data packets, and transmits the processed data packets either over the digital network or back to the cores for further processing. The receive BD ring includes BDs corresponding to the data packets received by the co-processor over the communication network. These data packets are processed by the co-processor and transmitted to the cores for further processing. The receive BD ring is polled by the cores to check for availability of data packets (which is typically done under a deferred processing thread such as a tasklet).

Each thread being executed by the processor requires at least one BD ring to access the co-processor. Generally, the number of BD rings of the co-processor is limited, which in turn limits the number of threads that can access the co-processor. Thus, it is desirable to scale the number of BD rings. However, as the polling logic in the co-processor must poll all the BD rings to retrieve corresponding data packets therefrom, the polling logic increases and becomes cumbersome. Further, polling a large number of BD rings increases the machine cycles of the processor and the co-processor. Thus, scaling the number of BD rings using the polling logic is not an efficient solution.

Another known technique to overcome the problem of a limited number of BD rings is sharing of a single BD ring by multiple threads. Thread synchronization (also referred to as "process synchronization" or "serialization"), i.e., a mechanism to ensure that the multiple threads being executed by multiple cores are coherent, is achieved using locks. A lock is a thread synchronization mechanism by which a set of threads is executed simultaneously and the set of threads shares the BD rings. Locks ensure that the multiple threads do not access a shared BD ring simultaneously. For example, if first and second BD rings are available for communication between the processor and the co-processor, then first and second sets of threads are associated with the first and second BD rings. Thus, the threads of the first set of threads share the first BD ring and the threads of the second set of threads share the second BD ring. When a thread of the first set accesses the first BD ring, the thread acquires a lock to the first BD ring. As the thread locks the first BD ring, no other threads of the first set is allowed access to the first BD ring until the running thread (the thread that owns the lock) is executed to completion. When the running thread is executed completely, it releases the lock and allows another thread of the first set to access the first BD ring.

However, in this thread synchronization mechanism, the threads other than the running thread have to wait to access the first BD ring until the lock is released. Further, if the running thread enters an infinite loop, the other threads will have to wait infinitely, resulting in a stalled operation of not only the core executing the thread, but also the co-processor. In addition to the existing resources, additional resources such as memory space for the locks, processing bandwidth for initialization and destruction of the locks, and the time required for acquiring and releasing of the locks add overhead (also referred to as "lock overhead"). Moreover, there is a possibility of a thread attempting to acquire a lock that is being held by another thread. Such a condition is referred to as "lock contention". A deadlock situation may also be reached when two threads wait to acquire a lock while a third thread holds the lock.

It would be advantageous to have a data processing system that processes multiple threads without the limitation of the number of BD rings, that is free of lock contention, lock overhead, and deadlock, and that overcomes the above-mentioned limitations of conventional data processing systems.

BRIEF DESCRIPTION OF THE DRAWINGS

The following detailed description of the preferred embodiments of the present invention will be better under

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a multi-core system for processing a plurality of threads is provided. The multi-core system includes a memory, a host processor, and a co-processor. The memory stores the plurality of threads, a plurality of data packets, and a plurality of buffer descriptor (BD) rings corresponding to the plurality of threads. Each BD ring includes a plurality of BDs, where a BD corresponds to a data packet. The host processor has a plurality of cores that communicate with the memory. The host processor processes the plurality of threads, with the cores executing the threads. The host processor generates and identifies a set of context switch events of the threads. The host processor further identifies a set of threads of the plurality of threads based on the set of context switch events and a set of BD rings corresponding to the set of threads. The host processor generates a notification command indicative of the set of BD rings and the set of context switch events and transmits the notification command to the co-processor. The co-processor is connected to the host processor and the memory and receives the notification command. The co-processor then polls the set of BD rings based on the notification command and processes a set of data packets corresponding to the set of BD rings.

In another embodiment of the present invention, a multi-core system for processing a plurality of threads is provided. The multi-core system includes a memory, a host processor, and a co-processor. The memory stores the plurality of threads, a plurality of data packets, and a plurality of BD rings corresponding to the plurality of threads. Each BD ring includes a plurality of BDs and each BD corresponds to a data packet. The host processor has a plurality of cores that communicate with the memory. The cores of the host processor execute the plurality of threads. The host processor generates a set of context switch events based on execution states of the threads and generates a context switch event notification command indicative of the set of context switch events. The host processor further transmits the context switch event notification command by way of a notification bus. The co-processor is connected to the host processor and the memory and receives the context switch event notification command. The co-processor then identifies the set of context switch events based on the context switch event notification command. The co-processor identifies a set of threads based on the set of context switch events and a set of BD rings corresponding to the set of threads. The co-processor further polls the set of BD rings and processes a set of data packets corresponding to the set of BD rings.

In yet another embodiment of the present invention, a method of processing a plurality of threads is provided. A multi-core system that includes a memory, a host processor, and a co-processor, processes the threads. The memory stores the threads, a plurality of data packets, and a plurality of BD rings corresponding to the plurality of threads. Each BD ring includes a plurality of BDs, where each BD corresponds to a data packet. The host processor processes the threads and generates a set of context switch events based on execution states of the threads. The host processor identifies the set of context switch events and a set of threads based on the set of context switch events. The host processor identifies a set of BD rings corresponding to the set of threads and generates a notification command indicative of the set of BD rings. The host processor transmits the notification command to the co-processor. The co-processor receives the notification command and polls the set of BD rings based on the notification command. The co-processor further processes a set of data packets associated with the set of BD rings.

Various embodiments of the present invention provide a multi-core system for processing a plurality of threads. The system includes a memory, a host processor, and a co-processor. The memory stores the threads, a plurality of data packets, and a plurality of BD rings corresponding to the plurality of threads. Each BD ring includes a plurality of BDs and each BD corresponds to a data packet. The host processor generates a set of context switch events based on execution states of the threads. The host processor identifies the set of context switch events and a set of threads based on the set of context switch events. The host processor identifies a set of BD rings corresponding to the set of threads and transmits a notification command indicative of the set of BD rings and the set of context switch events to the co-processor. The co-processor receives the notification command and polls the set of BD rings based on the notification command.

In another embodiment, the host processor transmits a notification command indicative of the set of threads and the set of context switch events. The co-processor identifies the set of BD rings corresponding to the set of threads and polls the set of BD rings based on the notification command. The co-processor further processes a set of data packets of associated with the set of BD rings. Thus, the multi-core system processes multiple threads without a limitation on the number of BD rings. The system does not require a large polling logic that utilizes many machine cycles. Further, the threads do not use locks to share the BD rings so the system is free of problems such as lock contention, lock overhead, and deadlock.

Figure 1:
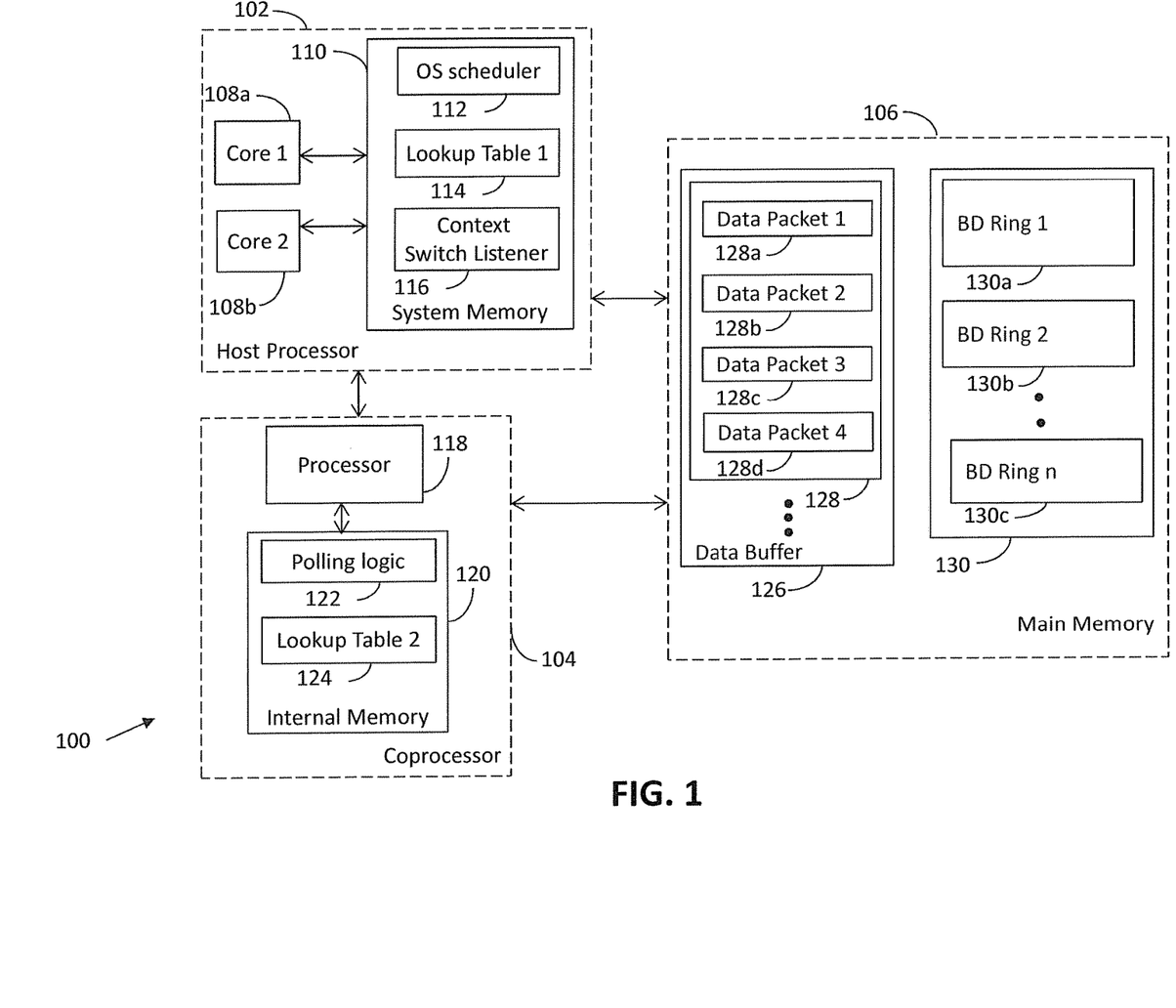
- FIG. 1 is a schematic block diagram of a data processing system for processing a plurality of threads in accordance with an embodiment of the present invention.

Referring now to FIG. 1, a schematic block diagram of a multi-core system 100 for processing a plurality of threads in accordance with an embodiment of the present invention is shown. The multi-core system 100 may be one of an access point and a base station in a communication network such as a computer network, a telephone network, and a cellular network. The multi-core system 100 includes a host processor 102, a co-processor 104, and a main memory 106.

The host processor 102 includes a plurality of cores, two of which are shown—first and second cores 108a and 108b, and a system memory 110. The system memory 110 includes an operating system (OS) scheduler 112, a first lookup table 114, and a context switch listener 116. The co-processor 104 includes a processor 118 and an internal memory 120. Examples of the co-processor 104 include cryptographic co-processors, compression accelerators, pattern-matching accelerators, encryption hardware accelerators and input/output (I/O) accelerators such as security encryption controllers, Ethernet controllers, and network-attached storage (NAS) accelerators. The internal memory 120 stores polling logic 122 and a second lookup table 124. The main memory 106 includes a data buffer 126 that stores data packets including first through fourth data packets 128a-128d (collectively referred to as data packets 128) and buffer descriptor (BD) rings including first through third BD rings 130a-130c (collectively referred to as BD rings 130).

The host processor 102 is connected to the co-processor 104. Both the host processor 102 and the co-processor 104 are connected to the main memory 106. The host processor 102 and the co-processor 104 communicate with each other by way of the BD rings 130. The BD rings 130 store information related to the data packets 128 such as status and control data, data packet length, and address pointers.

The system memory 110 also stores a large number of user space and kernel space threads (collectively referred to as "threads", not shown). Examples of the user space threads include application software and file system driver threads. Examples of the kernel space threads include OS threads and physical device driver threads. The OS threads include the OS scheduler 112 that manages the utilization of the multi-core system 100 resources such as processing time, communication bandwidth, and the BD rings 130 for processing the threads. Further, each thread and BD ring 130 have a corresponding thread ID and BD ring ID associated therewith. A thread has a dedicated BD ring 130 associated therewith. The first lookup table 114 (also referred to as a "mapping table") stores a mapping between the multiple thread IDs and corresponding BD ring IDs 130.

The first and second cores 108a and 108b fetch and execute the OS scheduler 112 and the context switch listener 116 from the system memory 110 for processing the data packets 128. In an embodiment of the present invention, the OS scheduler 112 is a pre-emptive scheduler that interrupts a thread being executed by either of the first or second cores 108a or 108b (also referred to as a "running thread") and schedules-in an alternate thread for processing. Switching of the running thread out of either of the first or second cores 108a or 108b for the alternate thread is referred to as a context switch event. The context switch listener 116 is firmware that detects the context switch event. In an embodiment of the present invention, the first and second cores 108a and 108b execute the context switch listener 116 and detect the context switch events. In one embodiment, only the first core 108a may execute the context switch listener 116 and detect the context switch events across both the first and second cores 108a and 108b. For example, if the first core 108a is a master core and the second core 108b is a slave core. The OS scheduler 112 may be a co-operative scheduler in another embodiment of the present invention.

The OS scheduler 112 may trigger multiple context switches during the processing of the data packets 128. When a context switch event occurs, the OS scheduler 112 generates a pre-empt notifier indicating that the context switch event has occurred. The context switch listener 116 receives the pre-empt notifier and accesses the first lookup table 114.

Further, each context switch event has a corresponding context switch event type. The context switch event includes a schedule-in event and a schedule-out event. The schedule-in event indicates that the threads are scheduled-in for processing in the first and second cores 108a and 108b while the schedule-out event indicates that the threads are scheduled-out of the first and second cores 108a and 108b. Each BD ring 130 that corresponds to a scheduled-in thread is referred to as an active BD ring and each that corresponds to a scheduled-out thread is referred to as an inactive BD ring.

The co-processor 104 receives the data packets 128 and processes and stores the data packets 128 in the data buffer 126. In an embodiment of the present invention, the co-processor 104 receives the data packets 128 from the communication network. In another embodiment of the present invention, the co-processor 104 receives the data packets 128 from the host processor 102. The co-processor 104 assists the host processor 102 in processing the data packets 128 by performing special functions including encryption, decryption, pattern matching, and decoding and consequently, increases the processing speed of the data processing system 100.

The processor 118 fetches and executes the polling logic 122 for polling the BD rings 130. The second lookup table 124 stores a list of active BD ring IDs corresponding to the active BD rings 130.

In operation, the system memory 110 stores first and second threads. The first and second cores 108a and 108b fetch and execute the first and second threads, respectively, the OS scheduler 112, and the context switch listener 116. The OS scheduler 112 triggers first and second context switch events at the first and second cores 108a and 108b, respectively. In an example, the first and second context switch events are schedule-in events. The OS scheduler 112 schedules-in third and fourth threads in the first and second cores 108a and 108b, respectively. The third and fourth threads have corresponding third and fourth thread IDs. When the context switch event occurs, the OS scheduler 112 generates the pre-empt notifier. The context switch listener 116 receives the pre-emptive notifier and retrieves the first and second BD ring IDs associated with the first and second BD rings 130a and 130b, respectively, corresponding to the third and fourth thread IDs from the first lookup table 114. Further, the context switch listener 116 generates a notification command that includes the first and second BD ring IDs and the first and second context switch event type, i.e., schedule-in event.

The processor 118 receives the notification command and identifies the BD rings 130a and 130b based on the notification command. The BD rings 130a and 130b are the active BD rings. The data packets 128a and 128b correspond to the BD ring 130a, and the data packets 128c and 128d correspond to the BD ring 130b. The processor 118 updates the list of active BD ring IDs in the second lookup table 124 by adding the first and second BD ring IDs corresponding to the active BD rings 130a and 130b thereto. The processor 118 further polls the active BD rings 130a and 130b based on the list of active BD ring IDs, and accesses and processes data packets 128.

In another example, the first context switch event is the schedule-in event and the second context switch event is the schedule-out event. Thus, the BD ring 130a is an active BD ring and the BD ring 130b is an inactive BD ring. When the processor 118 receives the notification command, the processor 118 updates the list of active BD ring IDs in the second lookup table 124 by adding the active BD ring ID corresponding to the active BD ring 130a and eliminating an inactive BD ring ID corresponding to the inactive BD ring 130b therefrom. Thus, the processor 118 polls the active BD ring 130a, and accesses and processes data packets 128a and 128b.

Figure 2:
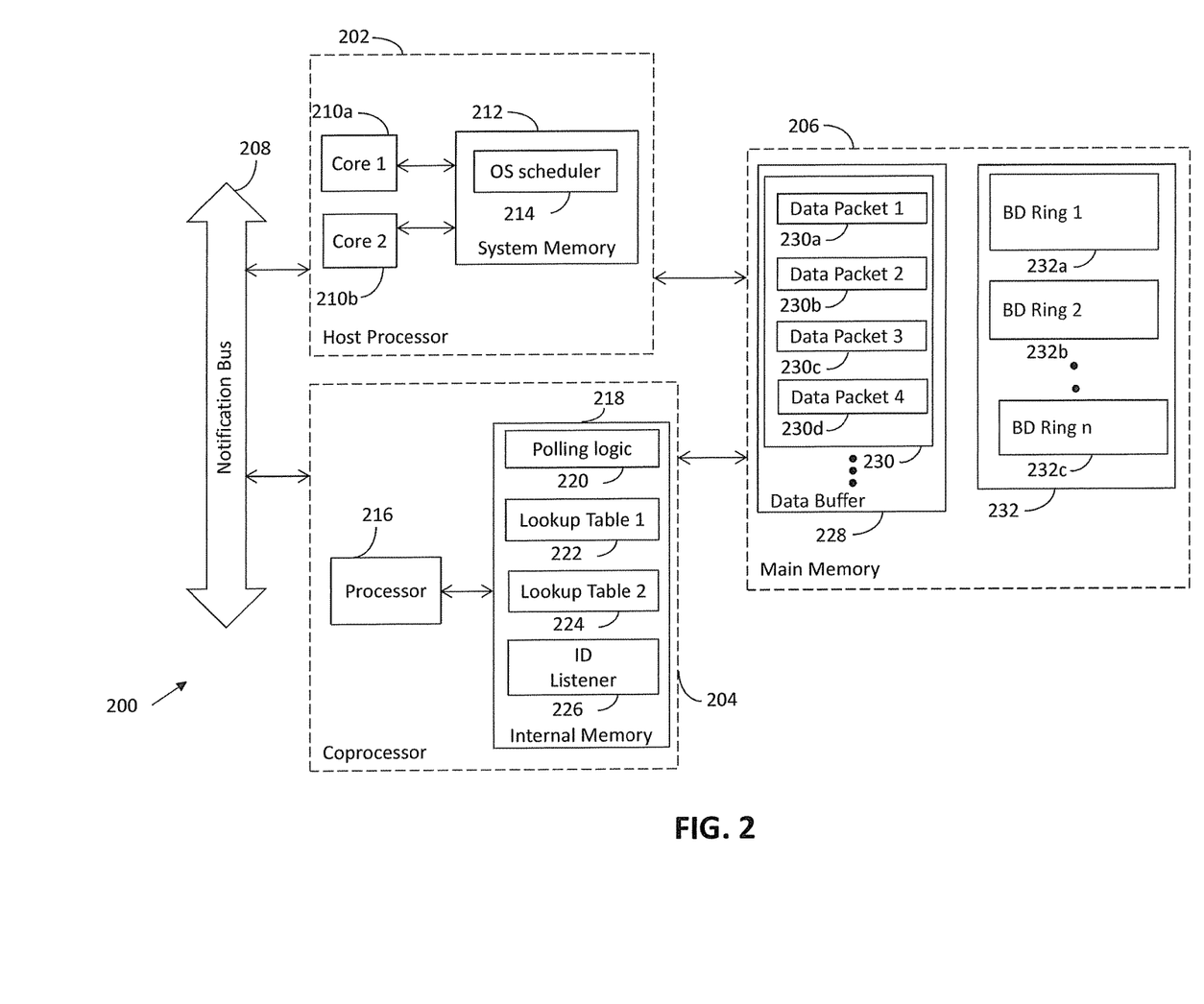
FIG. 2 is a schematic block diagram of a data processing system for processing the plurality of threads in accordance with another embodiment of the present invention.

Referring now to FIG. 2, a schematic block diagram of a multi-core system 200 for processing a plurality of threads in accordance with another embodiment of the present invention is shown. The system 200 includes a host processor 202, a co-processor 204, a main memory 206, and a notification bus 208. The host processor 202 includes first and second cores 210a and 210b and a system memory 212. The system memory 212 includes an OS scheduler 214. The first and second cores 210a and 210b, and the OS scheduler 214 are structurally and functionally similar to the first and second cores 108a and 108b, and the OS scheduler 112 of the system 100 of FIG. 1. The co-processor 204 includes a processor 216 and an internal memory 218. The processor 216 is structurally and functionally similar to the processor 118 of the system 100 of FIG. 1. The internal memory 218 includes polling logic 220, first and second lookup tables 222 and 224, and an ID listener 226. The polling logic 220, and first and second lookup tables 222 and 224 are functionally similar to the polling logic 122, and the first and second lookup tables 114 and 124 of the system 100 of FIG. 1. The main memory 206 is structurally and functionally similar to the main memory 106 of the system 100 of FIG. 1. The main memory 206 includes a data buffer 228 that stores multiple data packets including first through fourth data packets 230a-230d (collectively referred to as data packets 230), and multiple BD rings including first through third BD rings 232a-232c (collectively referred to as BD rings 232).

The host processor 202 and the co-processor 204 are connected to the notification bus 208 and the main memory 206. In an example, the notification bus 208 is a system bus. The host processor 202 and the co-processor 204 communicate with each other by way of the BD rings 232 and the notification bus 208. The BD rings 232 store information related to the data packets 230 such as status and control data, data packet length, and address pointers. The first lookup table 222 (also referred to as a "mapping table") stores a mapping between the multiple thread IDs and corresponding BD ring IDs and the second lookup table 224 stores a list of active BD ring IDs corresponding to the active BD rings 232. The ID listener 226 identifies thread IDs of corresponding threads that are either scheduled-in or scheduled-out by the first and second cores 210a and 210b.

In operation, the first and second cores 210a and 210b fetch and execute the OS scheduler 214. Further, the first and second cores 210a and 210b simultaneously fetch and execute first and second threads, respectively. The OS scheduler 214 triggers first and second context switch events at the first and second cores 210a and 210b, respectively. In an example, the first and second context switch events are schedule-in events. The OS scheduler 214 schedules-in third and fourth threads in to the first and second cores 210a and 210b, respectively. The third and fourth threads have corresponding third and fourth thread IDs. When the context switch event occurs the OS scheduler 214 generates the pre-empt notifier. The host processor 202 broadcasts the pre-empt notifier on to the notification bus 208 as a notification command (also referred to as a "context switch event notification command"). The notification command includes the third and fourth thread IDs and the first and second context switch event type i.e. schedule-in event. The host processor 202 transmits the notification command by way of the notification bus 208 to the co-processor 204.

The processor 216 fetches and executes the ID listener 226 and the polling logic 220. The ID listener 226 receives the notification command and identifies the third and fourth thread IDs. The ID listener 226 retrieves the first and second BD ring IDs associated with the first and second BD rings 232a and 232b, respectively, corresponding to the third and fourth thread IDs. Further, the ID listener 226 identifies the BD rings 232a and 232b as the active BD rings. The data packets 230a and 230b correspond to the BD ring 232a, and the data packets 230c and 230d correspond to the BD ring 232b. The processor 216 modifies the list of active BD ring IDs in the second lookup table 224 by adding the active BD ring IDs corresponding to the active BD rings 232a and 232b. The processor 216 further polls the active BD rings 232a and 232b based on the list of active BD ring IDs and accesses corresponding data packets 230.

In another example, the first context switch event is the schedule-in event and the second context switch event is the schedule-out event. Then the BD ring 232a is an active BD ring and the BD ring 232b is an inactive BD ring. When the processor 216 receives the notification command, the processor 216 updates the list of active BD ring IDs in the second lookup table 224 by adding the active BD ring ID corresponding to the active BD ring 232a and eliminating an inactive BD ring ID corresponding to the inactive BD ring 232b therefrom. Thus, the processor 216 polls the active BD ring 232a, and accesses and processes data packets 230a and 230b.

The data processing systems 100 and 200 process multiple threads without the limitation of the number of BD rings 130 and 232, respectively. The data processing systems 100 and 200 do not require a large polling logic as only the active BD rings are polled. As a result, machine cycles of the host processors 102 and 202, and the co-processors 104 and 204 are not wasted. Moreover, as the threads do not utilize locks to share the BD rings 130 and 232, the data processing systems 100 and 200 are free lock contention, lock overhead, and deadlock problems.

Figure 3:
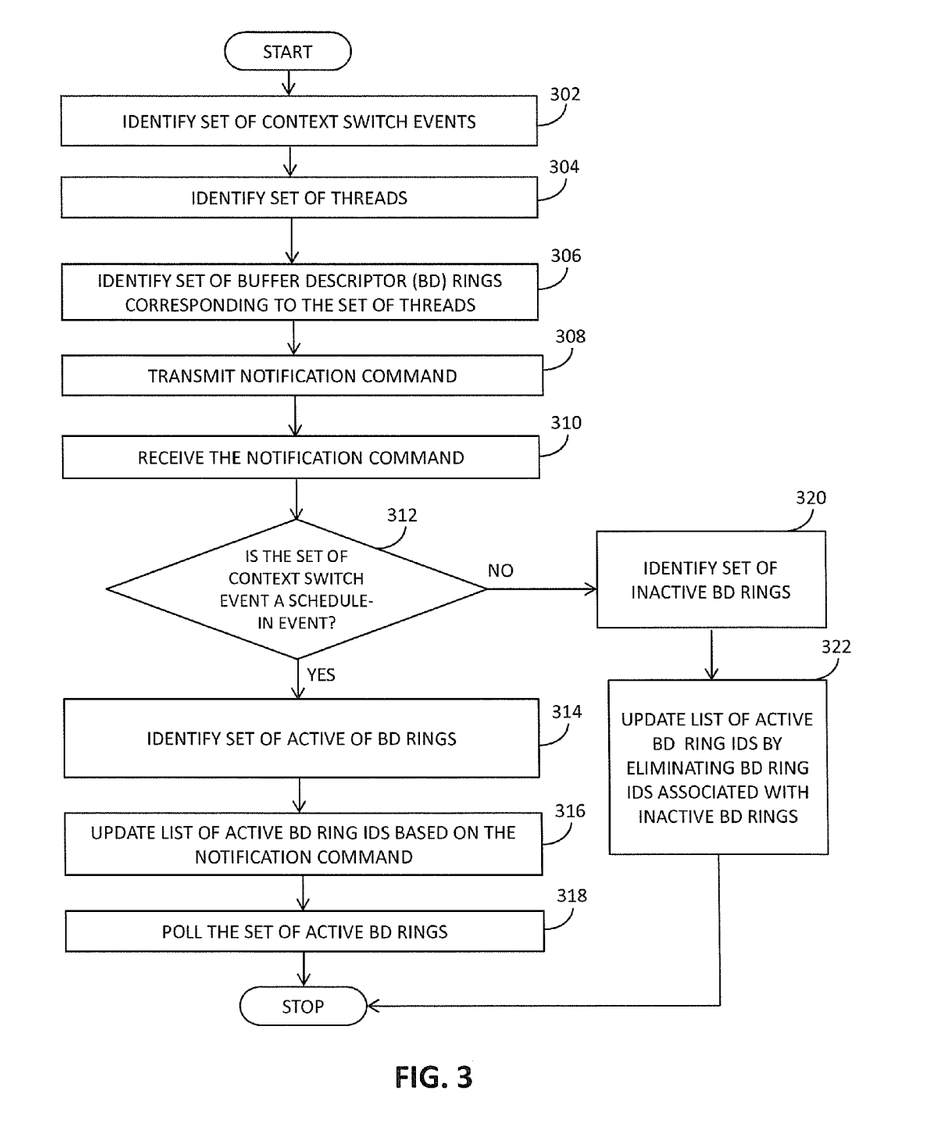
FIG. 3 is a flow chart illustrating a method for processing the plurality of threads by the data processing system of FIG. 1 in accordance with an embodiment of the present invention.

Referring now to FIG. 3, a method of processing the threads by the data processing system 100 in accordance with an embodiment of the present invention is shown. At step 302, the host processor 102 identifies a set of context switch events. At step 304, the host processor 102 identifies a set of threads that correspond to the set of context switch events. At step 306, the host processor 102 identifies a set of the BD rings 130 that correspond to the set of threads. At step 308, the host processor 102 generates and transmits a notification command that includes the context switch event type and the set of BD ring IDs associated with a corresponding set of BD rings 130. At step 310, the co-processor 104 receives the notification command. At step 312, a check is performed to determine whether the set of context switch events is a set of schedule-in events by the co-processor 104. If at step 312, it is determined that the set of context switch events is a set of schedule-in events, step 314 is performed. If at step 312, it is determined that the set of context switch events is not a set of schedule-in events, i.e., the set of context switch events is a set of schedule-out events, step 320 is performed. At step 314, the co-processor 104 identifies the set of BD rings as a set of active BD rings. At step 316, the co-processor 104 modifies a list of active BD ring IDs to include the set of active BD ring IDs associated with the set of active BD rings. At step 318, the co-processor 104 polls the set of active of BD rings 130. At step 320, the co-processor 104 identifies the set of BD rings based on the notification command as a set of inactive BD rings. The notification command identifies the set of BD ring IDs corresponding to the set of thread IDs that are scheduled-out. The co-processor 104 is not required to poll the set of BD rings that are associated with the identified set of BD ring IDs. Thus, the set of BD rings that are not polled are the set of inactive BD rings. At step 322, the co-processor 104 modifies a list of active BD ring IDs to eliminate the set of inactive BD ring IDs associated with the set of inactive BD rings.

Figure 4:
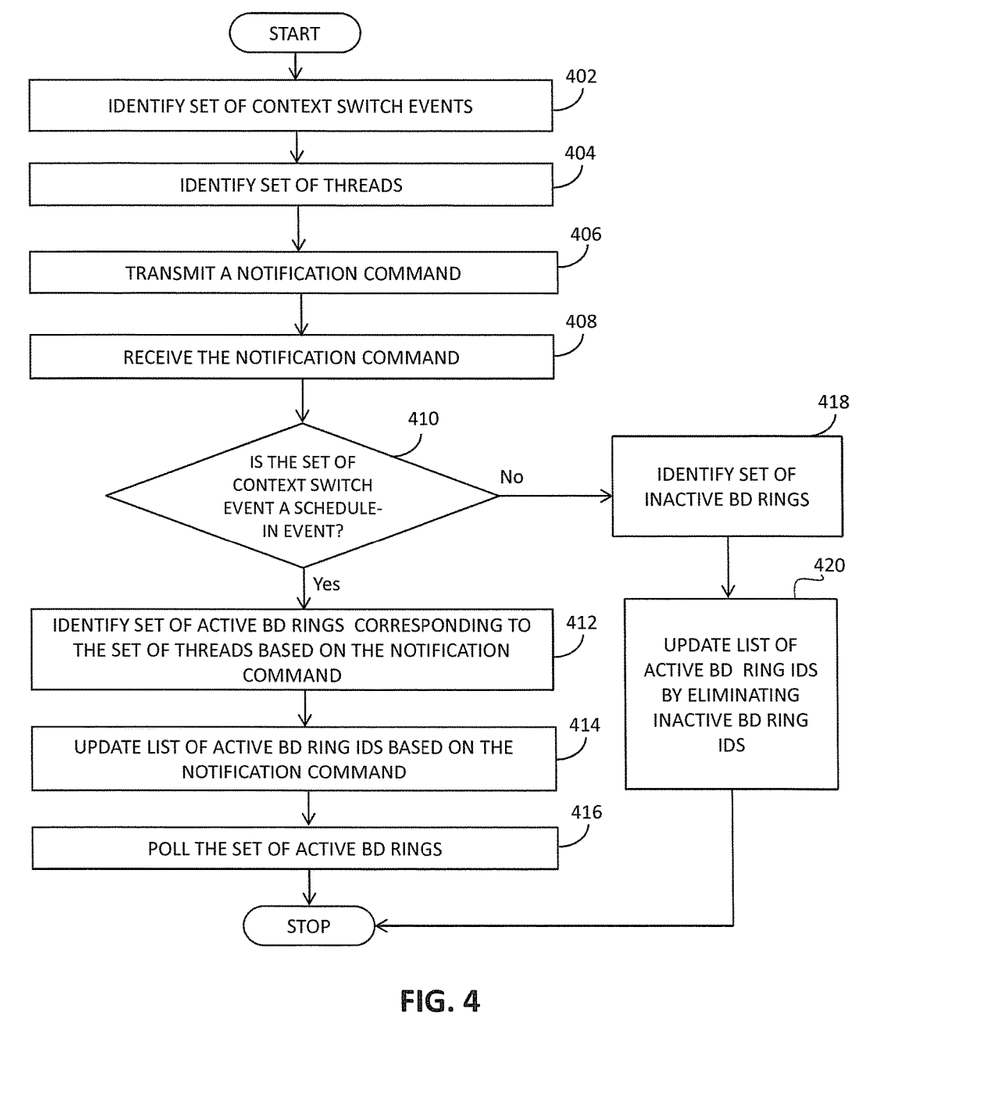
FIG. 4 is a flow chart illustrating a method for processing the plurality of threads by the data processing system of FIG. 2 in accordance with another embodiment of the present invention.

Referring now to FIG. 4, a method of processing the threads by the data processing system 200 in accordance with another embodiment of the present invention is shown. At step 402, the host processor 202 identifies a set of context switch events. At step 404, the host processor 202 identifies a set of threads of a plurality of threads corresponding to the set of context switch events. At step 406, the host processor 202 generates and transmits the notification command that includes the context switch event type and a set of thread IDs associated with the set of threads. At step 408, the co-processor 204 receives the notification command. At step 410, the co-processor 204 performs a check to determine whether the set of context switch events is a set of schedule-in events. If at step 410, it is determined that the set of context switch events is a set of schedule-in events, step 412 is performed. If at step 410, it is determined that the set of context switch events is not a set of schedule-in events i.e., the set of context switch events is a set of schedule-out events, step 418 is performed. At step 412, the co-processor 204 identifies the set of BD rings 232 corresponding to the set of thread IDs as a set of active BD rings based on the notification command. At step 414, the co-processor 204 modifies a list of active BD ring IDs to include the set of active BD ring IDs associated with the set of active BD rings 232. At step 416, the co-processor 204 polls the set of active of BD rings. At step 418, the co-processor 204 identifies the set of BD rings 232 corresponding to the set of thread IDs as a set of inactive BD rings based on the notification command. At step 420, the co-processor 204 modifies a list of active BD ring IDs to eliminate the set of inactive BD ring IDs associated with the set of inactive BD rings.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A multi-core system for processing a plurality of threads, the multi-core system comprising:
 a memory for storing the plurality of threads, a plurality of data packets, and a plurality of buffer descriptor (BD) rings corresponding to the plurality of threads, wherein each BD ring includes a plurality of BDs, and wherein a BD corresponds to a data packet;
 a host processor coupled to the memory and having a plurality of cores,
  wherein the host processor is configured for processing the plurality of threads, wherein each of the plurality of cores execute at least one thread of the plurality of the threads,
  generating a set of context switch events based on execution states of the plurality of threads, wherein a context switch event is a schedule-in event when a thread is scheduled-in to one of the cores and a schedule-out event when the thread is scheduled-out from the one of the cores,
  identifying the set of context switch events,
  identifying a set of threads of the plurality of threads based on the set of context switch events,
  identifying a set of BD rings of the plurality of BD rings corresponding to the set of threads,
  generating a notification command indicative of the set of BD rings and the set of context switch events, and transmitting the notification command; and
 a co-processor, connected to memory and to the host processor for receiving the notification command, polling the set of BD rings based on the notification command, and processing a set of data packets corresponding to the set of BD rings,
 wherein the co-processor stores a list of active BD ring IDs and polls the set of BD rings by performing the steps of:
  identifying the set of BD rings as a set of active BD rings when the notification command includes the schedule-in event;
  modifying the list of active BD ring IDs based on the notification command;
  identifying the set of BD rings as a set of inactive BD rings when the notification command includes the schedule-out event;
  modifying the list of active BD ring IDs by eliminating the set of inactive BD rings; and
  polling the set of active BD rings on the list of active BD ring IDs.

2. The multi-core system of claim 1, wherein each BD ring has a BD ring identification (ID) and each thread has a thread ID.

3. The multi-core system of claim 2, wherein the host processor stores a mapping table that includes a mapping between a plurality of BD ring IDs and a corresponding plurality of thread IDs.

4. The multi-core system of claim 1, wherein the notification command includes at least one BD ring ID and the context switch event.

5. The multi-core system of claim 1, wherein the co-processor comprises at least one of an Ethernet controller, a cryptographic co-processor, a pattern-matching co-processor, and a compression co-processor.

6. A multi-core system for processing a plurality of threads, the multi-core system comprising:
 a memory for storing the plurality of threads, a plurality of data packets, and a plurality of buffer descriptor (BD) rings corresponding to the plurality of threads, wherein each BD ring includes a plurality of BDs, and a BD corresponds to a data packet;
 a host processor, having a plurality of cores, that communicates with the memory and is configured for:
  processing the plurality of threads, wherein each of the plurality of cores execute at least one thread of the plurality of threads,
  generating a set of context switch events based on execution states of the plurality of threads on the corresponding plurality of cores,
  generating a context switch event notification command indicative of the set of context switch events, wherein a context switch event is a schedule-in event when a thread is scheduled-in to one of the cores and a schedule-out event when the thread is scheduled-out from the one of the cores, and transmitting the context switch event notification command by way of a notification bus; and
a co-processor connected to the host processor and the memory, that stores a list of active BD ring IDs, wherein the co-processor:
receives the context switch event notification command,
identifies the set of context switch events based on the context switch event notification command,
identifies a set of threads of the plurality of threads based on the set of context switch events,
identifies a set of BD rings corresponding to the set of threads,
polls the set of BD rings by performing the steps of:
identifying the set of BD rings as a set of active BD rings when the context switch event notification command includes the schedule-in event;
modifying the list of active BD ring IDs based on the context switch event command;
identifying the set of BD rings as a set of inactive BD rings when the context switch event command includes the schedule-out event; and
modifying the list of active BD ring IDs by eliminating a set of BD ring IDs associated with the set of inactive BD rings;
polling the set of active BD rings based on the list of active BD ring IDs, and
processes a set of data packets of the plurality of data packets corresponding to the set of active BD rings.

7. The multi-core system of claim 6, wherein each BD ring has a corresponding BD ring identification (ID) and each thread has a corresponding thread ID.

8. The multi-core system of claim 7, wherein the co-processor stores a mapping table that includes a mapping between a plurality of BD ring IDs and a corresponding plurality of thread IDs.

9. The multi-core system of claim 6, wherein the context switch event notification command includes at least one thread ID and the context switch event.

10. The multi-core system of claim 6, wherein the co-processor comprises at least one of an Ethernet controller, a cryptographic co-processor, a pattern-matching co-processor, and a compression co-processor.

11. A method of processing a plurality of threads, comprising:

storing the plurality of threads, a plurality of data packets, and a plurality of buffer descriptor (BD) rings corresponding to the plurality of threads in a memory, wherein each BD ring includes a plurality of BDs, and wherein a BD corresponds to a data packet;
processing the plurality of threads with a multi-core processor coupled to the memory, wherein threads are executed in parallel by different cores of the multi-core processor;
generating a set of context switch events based on execution states of the plurality of threads, wherein a context switch event is a schedule-in event when a thread is scheduled-in to one of the cores and a schedule-out event when the thread is scheduled-out from the one of the cores;
identifying a set of threads of the plurality of threads based on the set of context switch events;
identifying a set of BD rings of the plurality of BD rings that correspond to the set of threads;
generating a notification command indicative of the set of BD rings;
transmitting the notification command to a co-processor;
receiving the notification command at the co-processor;
polling the set of BD rings based on the notification command;
identifying the set of BD rings as a set of active BD rings when the notification command includes the schedule-in event;
identifying the set of BD rings as a set of inactive BD rings when the notification command includes the schedule-out event;
modifying a list of active BD ring IDs by eliminating the set of inactive BD rings; and
processing a set of data packets of the plurality of data packets associated with the set of BD rings identified in the list of active BD ring IDs, by the co-processor.

12. The method of claim 11, wherein each BD ring has a corresponding BD ring identification (ID), and each thread has a corresponding thread ID.

13. The method of claim 12, wherein the notification command includes the BD ring ID and the context switch event.

14. The method of claim 12, wherein the notification command includes the thread ID and the context switch event.

* * * * *